Sept. 22, 1931.  R. M. STORER  1,824,308
MOLD FOR FROZEN SUBSTANCES
Filed July 2, 1928
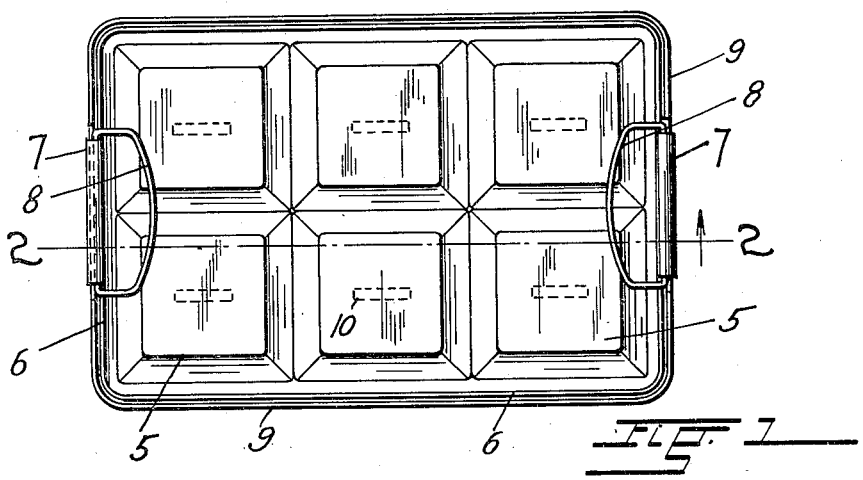
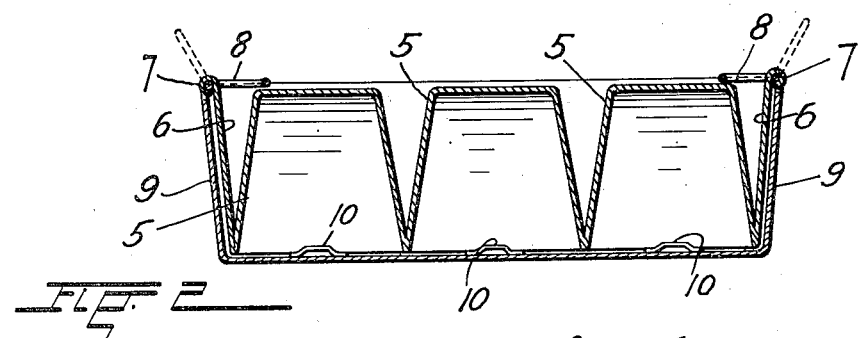
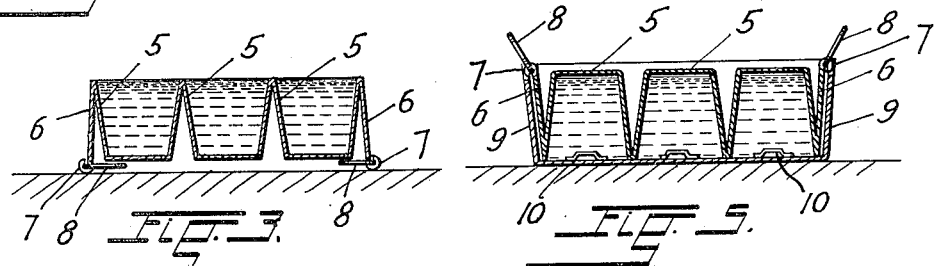
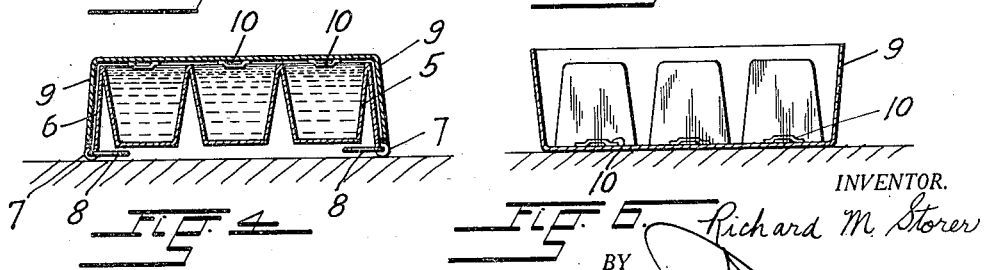

Patented Sept. 22, 1931

1,824,308

UNITED STATES PATENT OFFICE

RICHARD M. STORER, OF DENVER, COLORADO

MOLD FOR FROZEN SUBSTANCES

Application filed July 2, 1928. Serial No. 289,780.

My invention relates to improvements in molds for freezing liquids and semi-liquids, commonly used in electrical refrigeration. The principal object is to provide a mold that will automatically extricate itself from the frozen substance.

Since water and other substances increase their volume upon freezing, it is an object of the invention to utilize this property to carry out the foregoing object.

It is also an object of the invention to utilize the pressure caused by the expansion of such substance during freezing, to remove the mold gradually during the freezing.

Another object of the invention is to provide a mold for frozen substances from which the frozen matter may be removed without inverting it and holding it under a stream of running water as has been necessary heretofore.

Still further objects reside in details of construction and in novel combinations and arrangements of parts, as will more fully appear in the course of the following description.

In the drawings, in which like characters designate similar parts throughout the several views.

Figure 1 represents a plan view of an embodiment of the present invention;

Figure 2, a section taken on the line 2—2 of Figure 1;

Figure 3, a reduced longitudinal section of a mold filled with liquid to be frozen;

Figure 4, a longitudinal section similar to Figure 3, with a tray placed over the top of the mold;

Figure 5, a section similar to Figure 4, but with the parts inverted; and

Figure 6, a longitudinal section of the tray to the same scale as Figures 3 to 5, but with the mold removed.

Referring more specifically to the drawings, the reference character 5 designates a mold consisting of a plurality of cup-shaped units of truncated-pyramid form in edge to edge connection. The units are arranged inside of a surrounding frame 6, which fits within a tray 9. Handles 8 are hinged on opposite sides of the frame by hinge means 7.

The bottom of the tray may be roughened or have projections as shown at 10, to hold the ice cakes in position in the tray. However, the ice is usually frozen to the bottom of the tray, in which case no such roughening or projection is necessary.

In the operation of the present invention, the mold is filled with the liquid desired to be frozen.

The tray is then inverted and placed over the filled mold, as shown in Figure 4, and then the entire device is inverted to the position shown in Figure 5, in which the mold proper is in the inverted position.

The tray and mold in this position are then subjected to a freezing temperature, such as in the "frost unit" of a mechanical or electrical refrigerator.

In practice it has been found that the bottom and sides of the bodies of liquid in the mold freeze first. The center and top of the bodies freeze last. Thus while the lower portions of the bodies of liquid are freezing, the expansion of the bodies will cause the mold to be lifted from the tray and from the side surfaces of the cakes of ice without the liquid flowing out.

As the operation continues, the pressure of the expanding, freezing liquid gradually raises the mold from the tray. The pressure is not only exerted at and toward the closed end of the mold units, but also on the converging interior surfaces of the same, all tending to raise the mold and continuously separating it from the side surfaces of the forming cakes of ice.

When the bodies of liquid are completely frozen, the mold is easily lifted from the tray, leaving the frozen cakes of ice in the tray, as shown in Figure 6, to be separately and easily removed from the tray as needed.

The present invention avoids the old method of extricating ice cubes from the tray and the customary "grid", which, as heretofore conducted, consisted in holding the tray in an inverted position under running water, and catching the ice cubes by hand as they dropped from the tray.

The present invention is marked by its simplicity and by the fact that the cubes are automatically extricated from the mold and easily accessible for use as soon as frozen.

The device is not limited to the freezing of liquids, but is adaptable for freezing other substances such as custards, etc., either with or without the mold.

What I claim and desire to secure by Letters Patent is:

1. A device of the character described comprising a tray-member and a mold-member loosely supported upon the bottom thereof, and having cup-shaped freezing-units, closed at their upper ends and open at their lower ends to be closed by contact with the tray-member, the bottom of the tray-member having projections registering with the freezing-units to secure the frozen bodies upon removal of the mold.

2. A freezing process comprising confining a liquid, adapted to expand upon freezing, in a two-part mold, freezing the liquid, and applying the expansive force of freezing to the mold, whereby one part of the mold is lifted by and separated from the ice therein.

3. A freezing process comprising confining a liquid, adapted to expand upon freezing, in a two-part mold, one of said parts having walls converging toward a closed end, freezing the liquid, and applying the expansive force of freezing toward the closed end and the converging sides of the mold part, whereby said part is lifted by and separated from the ice therein.

4. A device of the character described comprising a tray member and a mold member fitted together, the mold member having sides converging toward a closed end and being open at the opposite end to be closed by the tray member, the mold member being liftable away from the tray member when the members are fitted together.

5. A device of the character described comprising a mold member, and a tray member of at least the depth of the interior of the mold member, the mold member having a frame closely fitting with the tray, the mold being closed at one end and the tray being adapted to close the mold at the other end, whereby the mold and tray may be inverted together without spilling material from the mold.

In testimony whereof I have affixed my signature.

RICHARD M. STORER.